Figure 1:
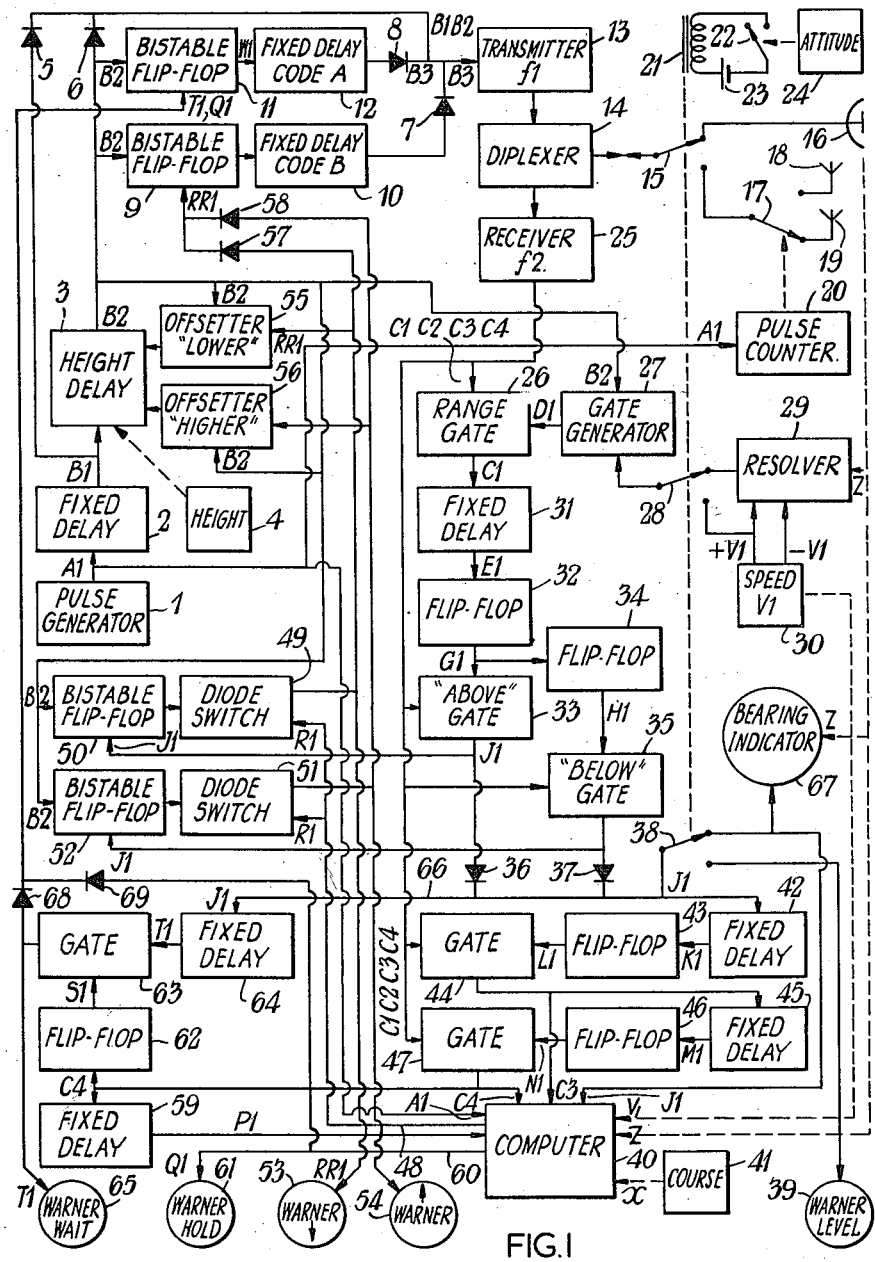

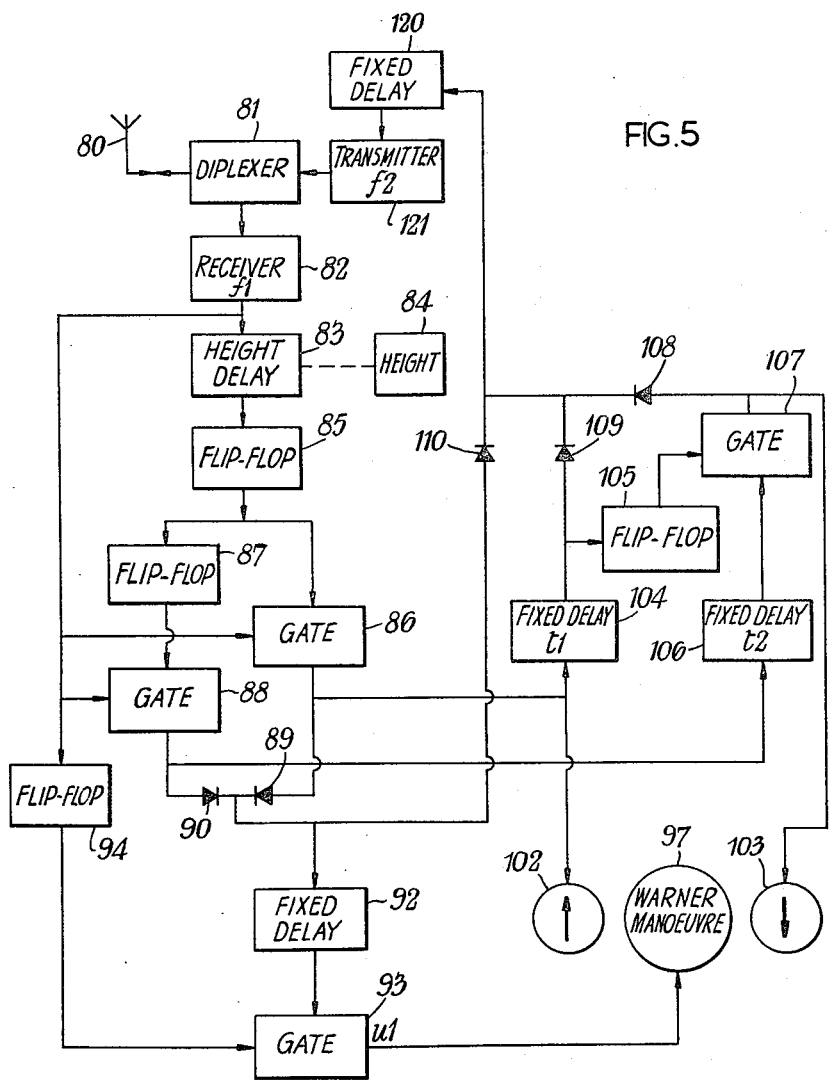

3,114,146
COLLISION PREVENTION SYSTEMS OF AIRCRAFT

Rudolf Arnold Wiersma, Kingston-on-Thames, and Harold Philip Freedman, Twickenham, England, assignors to Avel Corporation Geneva, Geneva, Switzerland
Filed Nov. 25, 1960, Ser. No. 71,507
Claims priority, application Great Britain Nov. 26, 1959
29 Claims. (Cl. 343—6.5)

The present invention concerns improvements in or relating to collision prevention systems for aircraft and the term "collision prevention" should be construed widely as including not only the prevention of collisions between two moving aircraft but also the prevention of collisions with fixed obstacles, the prevention of aircraft leaving or entering specified lanes or areas and generally for navigational purposes.

Proposals have been put forward for a co-operative system by means of which two aircraft can exchange data regarding their heights, speeds and courses in such a way that from the exchange or by virtue of the exchange the mutual bearing may be determined and it is known that from this data a computation may be made (based upon the assumption that the aircraft continue to fly on non-manoeuvring courses) which will effectively provide a protected air space around each aircraft such that another aircraft may not enter this protected air space upon a collision course without due warning being given to one or both of the aircraft. Such a system is exemplified by our co-pending patent application Serial No. 854,746, now U.S. Patent No. 3,071,767. Whilst it may be thought that this system is very satisfactory, it suffers from the inherent defect that the assumption is made that the aircraft are on non-manoeuvring courses and it may also suffer from the defect that an aircraft not on a collision course may enter the protected air space and, since no collision is imminent, neither aircraft will be aware of its dangerous proximity to the other aircraft and may initiate a manoeuvre which, when brought to finality, will bring the aircraft upon collision courses with less than the minimum escape manoeuvre time. It is quite obvious that in practice accurate computations as to collision risks can only be made upon the assumption that the aircraft in question are flying upon non-manoeuvring courses and it, therefore, appears desirable to extend the systems previously described so as to give a larger warning area which will surround each aircraft and so that if an aircraft enters this larger warning area, one or both aircraft will be advised that they must adopt a non-manoeuvring course, firstly to enable an accurate computation of the collision risks to be made and secondly to prevent the initiation of a dangerous manoeuvre when in a non-dangerous initial condition.

It is highly desirable to use for an interrogation-response system, a rotating directional antenna which covers 360° in azimuth in order to give all round protection and this is a primary point of difference from our co-pending patent application Serial No. 804,672 where the antenna was described as being of the type covering only some 180° in azimuth. Unfortunately, if a 360° antenna is used, the type of mounting is very restricted and the vertical coverage of the antenna must be very limited. Thus, if the aircraft is turned out of the vertical plane in order to climb, dive or bank for turning, it is very possible that the limitations in the antenna pattern will result in a failure to come into communication with another aircraft at the maximum range and this failure may persist until the second aircraft is below the minimum range for the avoidance of the collision. Furthermore, even if communication is achieved an accurate determination of the bearing is almost impossible.

Consequently, it seems to be essential that the computation of a collision risk should only be effective as a warning when both aircraft are flying straight and level, for a computation made at any other time is bound to be inaccurate or unsatisfactory for some other reason and it is probably more dangerous to make an inaccurate computation than to make no computation at all.

According to this invention, there is provided collision prevention apparatus for aircraft comprising an interrogator in a first aircraft and a responder in a second aircraft, wherein the responder is associated with means to transmit height, course and speed information, and the interrogator includes means to pass response signals to a computer in the first aircraft to determine the risk of collision, means being provided such that the computation cannot be carried out unless both aircraft are flying straight and level courses.

By the term "computer" as used herein is meant a device operating upon the speeds and courses of the two aircraft together with the bearing of the second aircraft from the first to determine the risk of collision.

The term "interrogator" should be understood to include a transmitter of interrogation signals and a receiver of response signals, whilst the term "responder" includes a receiver of interrogating signals and a transmitter of response signals.

The prevention of the computation is best carried out by disconnecting the computer or its outputs when the interrogating aircraft is not flying straight and level and suppressing the course and speed information when the responding aircraft is not flying straight and level.

However, it is desirable that even though the computation is not made, the two aircraft should be able to come into communication and accordingly when the interrogating aircraft is not flying straight and level it is convenient to disconnect its directional antenna and connect an omni-directional antenna designed to give all round coverage. The mere fact that a response is received, whether on the directional or omni-directional antenna, is sufficient to warn the pilot that he must commence or continue to fly upon a straight and level course and if the response that he receives does not include course and speed information a subsequent interrogation is modified to instruct the responding aircraft to level up. The intention is clearly that no computation is made unless accurate computation is possible and, if the computation is rendered impossible, directions are given to both aircraft to cause them to level up so as to make the computation possible.

Very desirably, the range from which responses are accepted will depend upon the relative bearing of the responder from the interrogator and also upon the flying speeds of the interrogator and responder so that around the interrogating aircraft is set up a protected air space of controlled shape such that whenever another aircraft enters this controlled space computation is made as to the risk of collision.

It is not sufficient to assume that if a computation is made and it is found that there is no actual risk of collision the same will hold true if the aircraft are then allowed to manoeuvre and consequently the fact that a computation has been carried out is signalled to the pilot as an indication that he must continue to fly upon a constant course until the responses are being no longer accepted, that is to say, until the other aircraft passes out of the protected air space.

If, on the other hand, it is decided that there is a risk of collision both pilots are warned to change height and this is done in such a way that if there is a very small difference in height between the two aircraft the signals are sent in such a way that both aircraft take opposite avoiding action.

Although it has been described that an omni-directional antenna is used, under certain circumstances it will be appreciated that it is inevitable that this antenna will suffer to some extent from shielding and consequently a plurality of omni-directional antennae are preferably used and are switched sequentially into circuit in such a manner as not to interrupt the interrogation-response sequence, for the use of antennae fed in parallel is liable to result in wave interference.

For the sake of this description, an aircraft is regarded as being fully equipped if it carries both the interrogating equipment and the complete responding equipment. However, by reasons of cost, space, weight, etc., some aircraft may not be fully equipped and therefore provision is made for a partially equipped aircraft which carries only the complete responding equipment. This equipment, it will be understood, cannot itself compute the collision risk but is capable of cooperating with a fully equipped aircraft to enable the collision risk to be computed and it can also co-operate to take the avoidance manoeuvres necessary to reduce the risk of collision. Finally, some aircraft may be only minimally equipped and may carry only a portion of the responding equipment but this affords some measure of protection.

Figure 2:
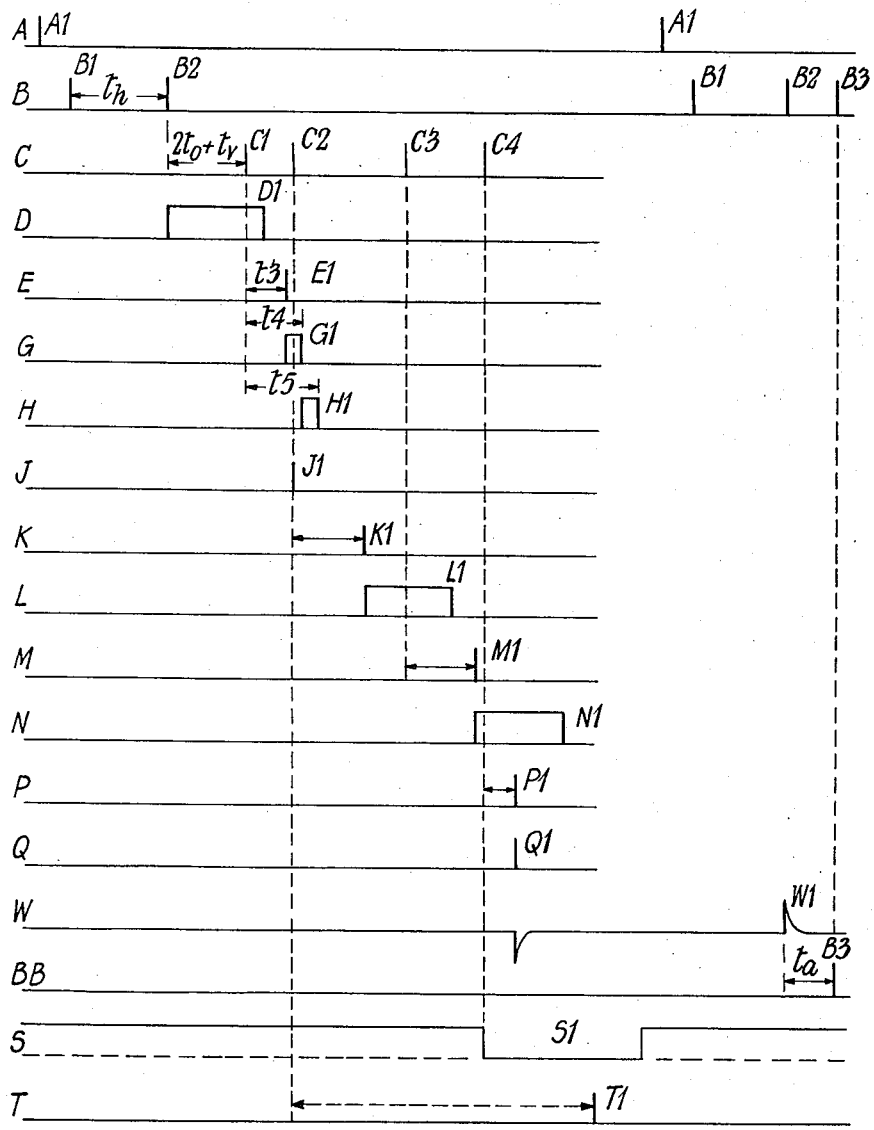
Figure 3:
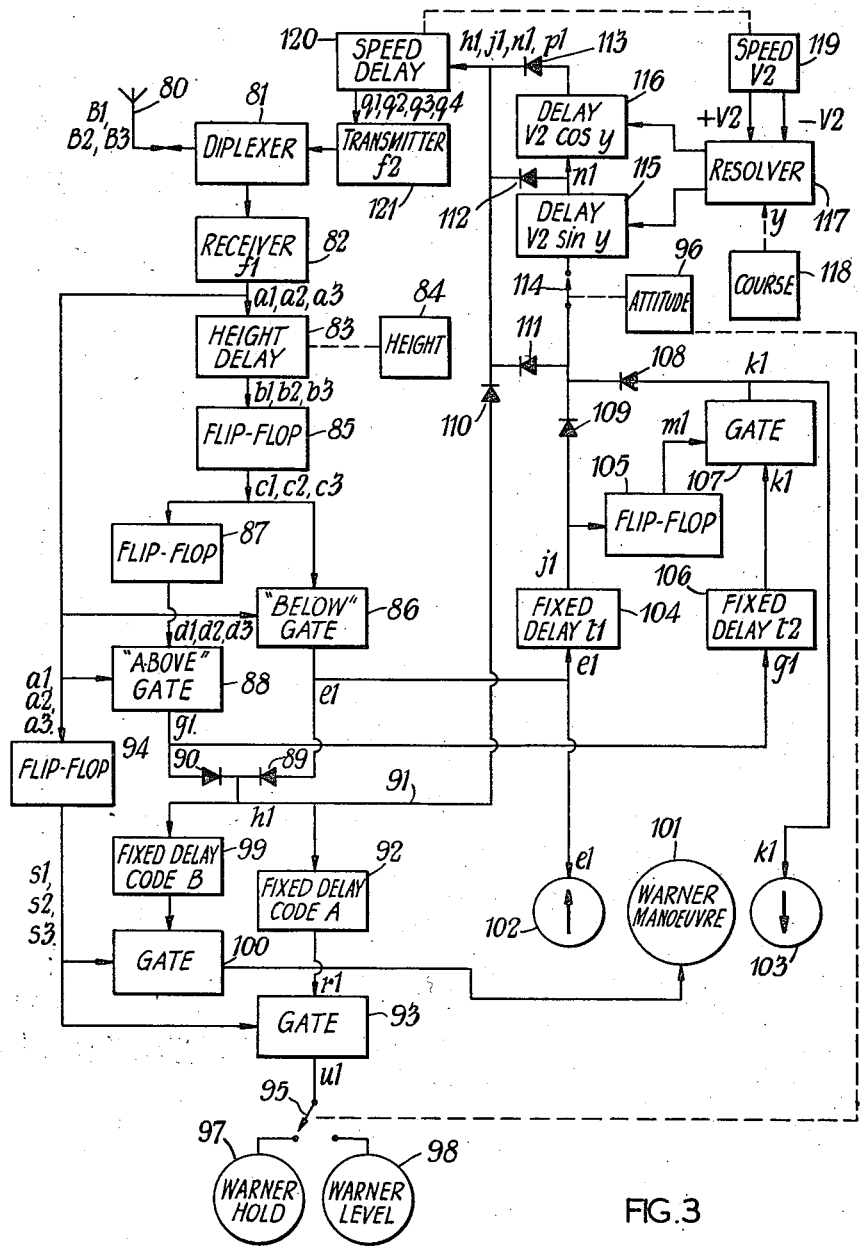
Figure 4:
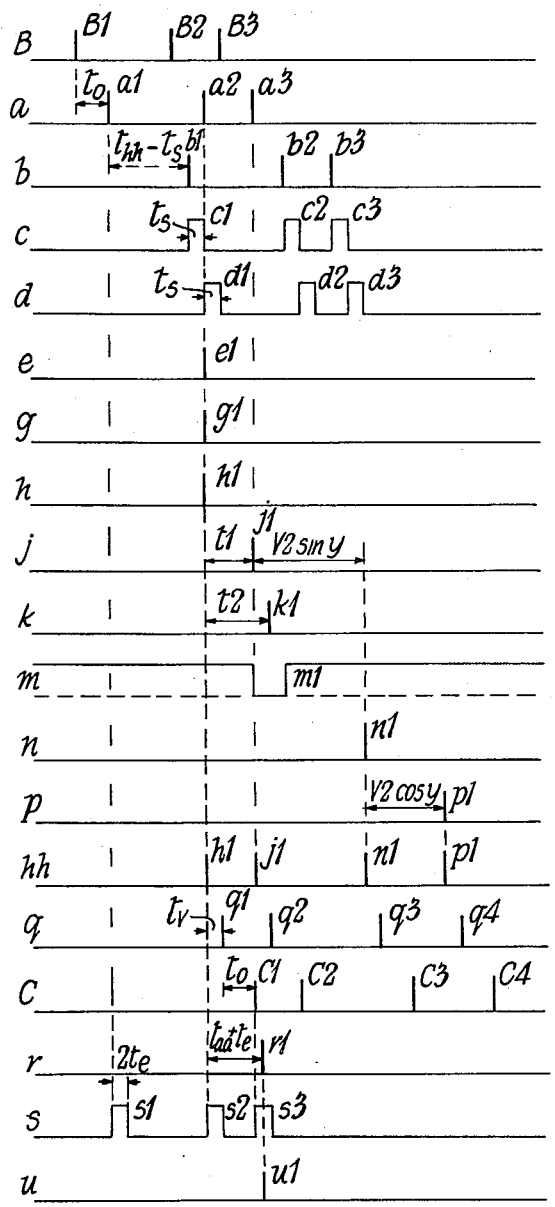

Other features and advantages of the present invention will become apparent from the following description which is made with reference to the drawings accompanying this specification. In these drawings:

FIG. 1 shows the interrogating apparatus for a fully equipped aircraft;
FIG. 2 shows diagrammatically the pulse sequence of the apparatus of FIG. 1;
FIG. 3 shows the responding apparatus;
FIG. 4 shows diagrammatically the pulse sequence in the responding apparatus of FIG. 3; and
FIG. 5 shows the responding apparatus for a minimally equipped aircraft.

Referring to FIG. 1, this shows, mainly in block form, the interrogating apparatus for a fully equipped aircraft, and the aircraft carrying this apparatus will be referred to as the "first aircraft."

The apparatus in the first aircraft includes a pulse generator 1 which generates a train of pulses, two of which are shown at A1, A1 on line A of FIG. 2, and additionally the points at which the pulses A1 appear are indicated in FIG. 1; in general the pulse sequence is shown in FIG. 2 and the points of emergence of the pulses in FIG. 1. The pulses A1 are fed to a delay device 2 producing a fixed delay, to emerge as a series of pulses B1, B1 on line B of FIG. 2. The pulses B1 are fed to a delay device 3 which is controlled by a pressure sensor 4 effectively measuring height, so that each pulse is delayed by a time $t_h$ which is characteristic of the height of the first aircraft, the delayed pulses being shown at B2, in FIG. 2. The pulses B1 from delay device 2 and the pulses B2 from delay device 3 are combined into a single channel, and recirculation of the pulses is prevented by suitable means such as diodes 5 and 6. Both pulses B1 and B2 are then used to key a transmitter 13, which thus generates a pulsed radio frequency carrier of frequency $f_1$.

The output from the transmitter 13 is fed to a transmit-receive switch or diplexer 14, which routes the output to a switch 15, which is controlled by a relay or solenoid 21. The relay 21 is not energised when the aircraft is more or less level, but when the aircraft is manoeuvring so that a certain angle of roll or pitch, say 5 degrees, is exceeded, an attitude-sensitive gyroscope 24 closes a switch 22 so that a source of voltage 23 energises the relay 21. When the aircraft is level, and the relay 21 is not energised, the switch 15 connects the diplexer 14 to a directional antenna 16, which transmits and receives on a beam which is narrow in azimuth, the antenna 16 being rotated about a vertical axis by a motor, not shown. When the aircraft is tilted sufficiently, the relay 21 is energised and the switch 15 connects the diplexer 14 to a switch 17, which connects one or other of two omni-directional antennae 18, 19 into circuit. The switch 17 is controlled by a pulse counter 20, which receives the pulses A1 from the pulse generator 1. After receiving a certain number of pulses, say eight, the pulse counter 20 changes the switch 17 from the antenna 18 to the antenna 19, and after counting another eight pulses, it changes the switch 17 back to the antenna 18, and so on, so that antennae 18 and 19 are in use for equal periods of time. It will normally be possible to locate the antennae 18 and 19 on the aircraft so that between them they give complete coverage in the horizontal plane in which the aircraft is flying, for all attitudes of the aircraft, but obviously more than two antennae can be used if necessary by switching between them in sequence.

The pulse counter 20 reaches the count of eight at the moment it receives one of the pulses A1 which are in effect pre-pulses. The switch 17, which may be an electronic switch using semiconductor diodes, must then act very quickly so that antenna changeover takes place before the first interrogation pulse B1 occurs. This method of switching (controlled by pulse counting) ensures that a changeover does not occur in the middle of receiving a response, which might result in some pulses being lost. As the number of pulses in a response is significant in affecting the operation of the interrogating equipment, it is desirable to avoid losing pulses by changing over antennae at arbitrary times.

In any case, the interrogation signal, consisting of pulses at times B1 and B2, is radiated on the frequency $f_1$ from one of the antennae 16, 18 or 19 and if there is a second aircraft within communicating range, at approximately the same height, it will respond with either two or four pulses, depending on whether it is minimally, partly or fully equipped, and, in the case of full and partial equipment, on whether it is manoeuvring or flying level at that moment. Both pulses B1 and B2 must be received in the second aircraft before its responder can decode the height coding and decide whether or not to send back a response and therefore the earliest time at which a response can arrive, i.e. if the responder is at zero range, is at the time of transmission of the pulse B2. Accordingly the pulse B2 from the output of the delay device 3 is used to trigger a gate pulse generator 27, so initiating a range gating pulse shown as D1 in FIGURE 2. This pulse D1 is fed to the control input of a range gate 26 to open this gate.

The response pulses on a frequency $f_2$ are received by the same antenna as was used for transmitting the corresponding interrogation, and are routed by the diplexer 14 to a receiver 25, where the signals are amplified and demodulated, the output pulses being fed to the signal input of the range gate 26. These output pulses are designated as C1 and C2 for all responses together with C3 and C4 if the responder has four pulses.

The time, say $t_0$, required to transmit a signal between the first aircraft and the second aircraft is proportional to the range. Thus the value of the delay $2t_0$ between transmitting the second interrogation pulse B2 and receiving the first response pulse C1, is used to decide whether the response is accepted by the interrogator or rejected as coming from an aircraft at too great a range to be of interest. This limiting range is not fixed, but is varied in accordance with various factors, by varying the duration of the gating pulse D1, as follows.

When the first aircraft is flying more or less level, and the antenna 16 is in use, a switch 28, controlled by the relay 21, connects a control input of the gate pulse generator 27 to a resolver 29, and the shaft of this resolver is rotated in synchronism with the antenna 16, so that the angular position of the shaft corresponds to the angle Z between the heading of the aircraft and the direction in which the antenna is beamed. The resolver 29, which may be a sine-cosine potentiometer, receives from a speed sensor 30 positive and negative voltages, both proportional to the speed V1 of the first aircraft, and the voltage output of the resolver is proportional to V1 cos Z, that is, to the component of the aircraft's speed resolved in the direction in which the antenna is beamed, or, in other words, towards the responding aircraft, at the moment when a response is received. The gate pulse generator 27 is typically a phantastron whose sweep time is made to depend on the applied control voltage from the resolver 29. Thus the voltage output from the resolver 29 controls the duration of the pulse D1 so that the maximum range of a responder whose response is accepted depends on the first aircraft's component of velocity towards the responder. This makes the warning time, that is to say, the period between the moment of first warning and the moment of closest approach, more nearly constant than would be the case if the same duration of pulse D1, and hence the same limiting range, were used in every direction.

When the first aircraft is manoeuvring, and either of the antennae 18 or 19 is in use, the switch 28 connects the control input of the gate pulse generator 27 directly to the positive output of the speed sensor 30, so that the control voltage corresponds to the speed V1. It is not possible to discriminate between different directions when using either of the omni-directional antennae 18, 19 and so the duration of the pulse D1 is therefore made long enough to give an adequate warning time even for the highest possible rate of approach which corresponds to a second aircraft directly ahead.

If the first pulse C1 of the response occurs during the pulse D1, it is accepted by the range gate 26, and decoding follows to determine whether the responding aircraft is higher or lower, and further decoding follows to determine whether there are two pulses or four in the response. If there are four pulses, a computation is made to decide whether there is risk of collision.

If the first pulse C1 of the response occurs after the pulse D1, there is no output from the range gate 26, and all further pulses are rejected by the decoding circuits.

As described later in detail with reference to FIGURE 3, if the responder decides that the first aircraft is lower than the second aircraft, the second response pulse C2 occurs at a time $t1$ after the pulse C1, whereas if it decides that the first aircraft is higher, the pulse C2 occurs ta a time $t2$ after the pulse C1, where $t2$ is somewhat greater than $t1$. To discover which coding has been used, a gate 33 is opened at a time $t3$ after the pulse C1 and closed at a time $t4$ after the pulse C1, where $t3$ is slightly less than $t1$ and $t4$ is halfway between $t1$ and $t2$. Another gate 35 is opened at a time $t4$ after the pulse C1 and closed at time $t5$ after the pulse C1, where $t5$ is sligthly greater than $t2$. The received pulses are fed to the signal inputs of these gates 33, 35, so that the pulse C2 will be accepted by the gate 33 if the delay is $t1$ or accepted by the gate 35 if the delay is $t2$. The gates 33, 35 are opened for longer periods than are theoretically necessary to allow for inaccuracies in time delays in the two aircraft.

In more detail, the pulse C1 from the range gate 26 is fed to a delay device 31 which produces a fixed delay $t3$, and the delayed output pulse E1 is fed to a monostable flip-flop 32, which produces a pulse G1 of length $(t4-t3)$, so that the end of the pulse G1 occurs at a time $t4$ after the pulse C1. The pulse G1 is fed to the control input of the gate 33, which is fed at its signal input with the received pulses, C1, C2 and possibly also C3 and C4, depending on the responder. If the pulse C2 occurs during the opening of the gate 33 by the pulse G1, the gate 33 produces an output pulse J1, and thus the emergence of a pulse J1 from the gate 33 means that the second aircraft is higher than the first aircraft.

The pulse G1 from the flip-flop 32 is also fed to a monostable flip-flop 34, which is triggered by the trailing edge of the pulse G1 and produces a pulse H1 of length $(t5-t4)$, so that the end of the pulse H1 occurs at a time $t5$ after the pulse C1. The pulse H1 is fed to the control input of the gate 35, which receives pulses C1, C2 and possibly C3, C4 at its signal input. If the pulse C2 occurs during the opening of the gate 35 by the pulse H1, the gate 35 produces an output pulse J1 coincident in time with pulse C2, and the emergence of a pulse J1 from the gate 35 means that the second aircraft is lower than the first. In FIGURE 2 and the following description, the pulse C2 is assumed to occur during the pulse G1, so that the pulse J1 emerges from the gate 53, meaning that the second aircraft is higher.

The output lines of the gates 33, 35 are fed via diodes 36, 37 to a line 66, so that the pulse J1 appears on the line 66 if the pulse C2 is accepted by either of the gates 33, 35. The line 66 is connected to a switch 38, which is controlled by the relay 21, and if the first aircraft is flying level, this switch 38 connects the line 66 to a first input of a collision computer 40, for which pulse J1 acts as an initiating pulse. Unless the pulse J1 has been received the computer 40 will later produce no output, that is to say will make no decision. During level flight, the switch 38 also feeds the pulse J1 to a bearing indicator 67 which is typically in the form of means to produce visible indications at angular positions to show the bearings of responding aircraft, and this is particularly useful in the case of minimally equipped aircraft, for which no collision computation can be made. One form of bearing indicator 67 comprises a rotating member driven in synchronism with the antenna 16, such member carrying a lamp which is illuminated for a short period whenever a pulse J1 appears.

If the first aircraft is not flying level, the relay 21 is energised and the switch 38 disconnects the line 66 from the computer 40 and from the bearing indicator 67, since computation and indication of bearing are impossible without using the directional antenna 16. In this case the switch 38 connects the line 66 to a warning device 39, which, on receiving one or more pulses J1, illuminates a sign which warns the pilot to stop manoeuvring. If the first aircraft is brought back to level flight, this warning ceases and the switch 38 reconnects the computer 40 and the bearing indicator 67.

The line 66 is also connected directly to a delay device 42, producing a fixed delay, so that on receiving the pulse J1, the delay device 42 produces an output pulse K1. The output pulse K1 is fed to a monostable flip-flop 43, which generates a gating pulse L1, which is fed into the control input of a gate 44. The signal input of the gate 44 is fed by the receiver 25 with pulses C1 and C2, and also C3 and C4 if these are present.

If a third pulse C3 is present to form part of a coded response, the interval between the pulses C2 and C3 represents the component resolved eastward of the speed V2 of the second aircraft, namely $V2 \sin y$, where $y$ is the course angle of the second aircraft. This interval between the pulses C2 and C3 therefore has minimum and maximum limiting values, and the gate 44 is opened by the pulse L1 for a period which covers only this range of values so as to eliminate as far as possible all unwanted pulses. The delay of the start of the gate pulse L1 by the delay device 42 also serves to prevent the gate 44 from accepting the tail end of the pulse C2.

The output of the gate 44, consisting of the pulse C3, is fed to a second input of the computer 40, and also to the input of a delay device 45, similar to the delay device 42. The output of the delay device 45 is a pulse M1 which is fed to a flip-flop 46, similar to the flip-flop 43, and producing a gating pulse N1, which is fed into the control input of a gate 47. The signal input of the gate 47 is fed by the receiver 25 with the pulses C1, C2, C3 and C4. If the pulse C4 forms part of a coded response, the interval between the pulses C3 and C4 represents the component (resolved northwards) of the speed V2 of the second aircraft, namely $V2 \cos y$, and the gate 47 is opened by the pulse N1 for a period covering the possible range of value of this interval.

The output of the gate 47, consisting of the pulse C4, is fed to a third input of the computer 40. The computer 40 contains two time demodulators of the type working by direct time comparision without feedback, so that a voltage output is obtained from one reference pulse followed by one time modulated pulse. For the first time demodulator, the pulse J1 which is coincident with the pulse C2, acts as reference pulse and the pulse C3 as the time modulated pulse, the voltage output being proportional to the interval between the pulses C2 and C3, that is, to $V2 \sin y$. For the second time demodulator, the pulse C3 acts as the reference pulse and the pulse C4 as the time modulated pulse, the voltage output being proportional to the interval between the pulses C3 and C4, that is, to $V2 \cos y$.

The computer receives three further inputs, which may be either mechanical or electrical, namely the course $x$ of the first aircraft, derived from a compass repeater 41, the speed V1 of the first aircraft, obtained from the speed sensor 30, and the relative bearing of the second aircraft obtained from the angular position Z of the antenna 16.

The computer 40 is preferably of the type described in the co-pending patent application Serial No. 804,672. The computer there described computes the relative velocity of the second aircraft with respect to the first aircraft as two components, namely those parallel to and perpendicular to the line joining the two aircrafts, which is the direction in which the antenna 16 is beamed at the moment of receiving the response. If the parallel component of the relative velocity is directed towards the first aircraft, and the perpendicular component is substantially zero, this means that the aircraft are on collision courses, and the computer decides accordingly. This computer performs only processes of multiplication, addition and comparison of voltage or current, all of which are performed by electrical means, and thus almost instantaneously.

The computer 40, whatever type is used, cannot make a correct decision till it has received the pulse C4 and its internal circuits have reached final states depending on the values of the voltages obtained by time demodulation. Thus the output of the gate 47, consisting of the pulse C4, is fed into a delay device 59 and the resulting delayed output pulse P1 is fed into the computer 40 to extract the result of the computation. On receiving the pulse P1, the computer 40 emits a pulse either on an output line 60 or on an output line 48, depending on the estimate of collision risk at that moment. If it decides that there is no appreciable risk of collision, the computer 40 emits a pulse Q1 on line 60, which is connected to a warning device 61. The warning device 61, on the receipt of one or more pulses Q1 illuminates a sign to warn the pilot to maintain his existing course and speed. The pulse Q1 is also fed via a diode 69 to a first input of a flip-flop 11, but a diode 68 prevents the pulse Q1 from reaching a warning device 65, whose use will be explained later. The flip-flop 11 is a bistable device, that is to say it has two stable states, which will be referred to as the "0" state and the "1" state, and it remains in whichever state it happens to be in until triggered by an input pulse. The second input of the flip-flop 11 is fed with pulses B2 from the delay device 3. Whatever the state of the flip-flop 11 before receiving a pulse B2, immediately after receiving a pulse B2 it is left in the "0" state. A pulse B2 occurs during every interrogation, so that the flip-flop 11 remains in the "0" state until a pulse Q1 appears at the first input, when it is triggered into the "1" state. The flip-flop 11 feeds a delay 12 through an output network of short time constant so that the delay device 12 receives a short negative pulse when the flip-flop 11 is triggered from the "0" state to the "1" state and a short positive pulse W1 when it is triggered from the "1" state to the "0" state and it is arranged that delay device 12 is not responsive to a negative input pulse.

Thus the appearance of a pulse Q1 causes the flip-flop 11 to produce a negative output pulse, which does not affect the delay device 12, but the arrival of the pulse B2 in the subsequent interrogation causes the flip-flop 11 to produce the positive output pulse W1, to which the delay device 12 responds by producing an output pulse B3 delayed by an interval $t_a$ after pulse B2, this delayed pulse B3 being shown in the second interrogating sequence on line B of FIGURE 2. The pulse B3 is fed through a diode 8, which prevents other pulses from reaching the delay device 12, to the input of the transmitter 13, which is thus keyed by the pulse B3 as well as the pulses B1 and B2, producing a three pulse interrogation signal on frequency $f_1$. If no pulse Q1 appears the flip-flop 11 is unaffected by the pulse B2, and produces no output pulse, so that the delay device 12 produces no pulse B3 and the interrogation remains as two pulses.

The interval $t_a$ between the pulses B2 and B3 is outside the range of values which the interval $t_h$ between the pulses B1 and B2 can assume. This characteristic pulse spacing $t_a$, which will be referred to as code A, is decoded in the second aircraft as hereinafter described, and if the second aircraft is not manoeuvring when it receives code A its pilot is warned to maintain his existing course and speed. The object of warning both pilots to maintain their existing courses and speeds is that, since the computer 40 has decided that they are safe, it is best to maintain these courses and speeds till the aircraft have passed each other, after which the distance between the aircraft increases till it reaches a value no great that the first pulse C1 of the response no longer passes through the range gate 26, when the warnings in both aircraft automatically cease.

The above description follows the course of events that occurs when the computer 40 decides that there is no appreciable risk of collision. On the other hand, if the computer 40 decides that the collision risk is appreciable, allowing for possible inaccuracies in telemetry, computing, and so on, and the impossibility of maintaining precisely the existing courses and speeds, then on receiving the pulse P1 from the delay device 59, the computer 40 emits a pulse R1 on the line 48. This pulse R1 is fed to the switching inputs of two diode switches 49 and 51, to release information on the relative height of the second aircraft which is stored in two flip-flop 50, 52. The flip-flops 50 and 52 are devices having two stable states, which states will be referred to as the "0" state and the "1" state. When it is in the "0" state, the output of the flip-flop 50 is at zero potential, whereas when it is in the "1" state, the output of the flip-flop 50 is at a positive potential, and the same holds for the flip-flop 52 in its "0" and "1" states. A first input of the flip-flop 50 is connected to the output of the gate 33, and the output of the flip-flop 50 is connected to the signal input of the diode switch 49. A first input of the flip-flop 52 is connected to the output of the gate 35, and the output of the flip-flop 52 is connected to the signal input of the diode switch 51. A second input of the flip-flop 50 and a second input of the flip-flop 52 are both connected to the output of the delay device 3. During each interrogation, at a time before the reception of a response can have caused the emergence of a pulse J1 from the output of either of the gates 33, 35, the pulse B2 from the delay device 3 sets both flip-flops 50, 52 to their "0" states, if they are not already in these states.

When the pulse J1 emerges from either of the gates 33 or 35 depending on whether the response from the second aircraft indicates that it is above or below the first aircraft, either flip-flop 50 or flip-flop 52 receives the pulse J1 at its first input and is triggered into the "1" state. Whichever is so triggered, the output voltage of that flip-flop changes from zero to a positive value, while the output voltage of the other flip-flop remains at zero.

If the pulse J1 emerges from the gate 33, the diode 37 prevents it from triggering the flip-flop 52, and if it emerges from the gate 35, the diode 36 prevents it from triggering the flip-flop 50.

When the pulse R1 on the line 48 reaches the diode switches 49, 51 it renders these momentarily conducting, so that the signal input and output terminals of each diode switch are brought momentarily to the same potential. In the present description, the pulse J1 is assumed to emerge from the gate 33, signifying that the second aircraft is higher than the first, and the flip-flop 50 is triggered into the "1" state, with a positive output voltage, while the flip-flop 52 remains in the "0" state, with zero output voltage. On the arrival of the pulse R1, the output of the flip-flop 50 is connected momentarily to a warning device 53, an offsetting device 55 and a diode 57 which is connected to a first input of a flip-flop 9, thus feeding to each of these devices a positive pulse RR1 coincident in time with the pulse R1.

The warning device 53, on receiving one or more such positive pulses, instructs the pilot to dive, so as to avert the threatened collision, and the pilot of the second aircraft is given complementary instructions about changing height, as will be described. The flip-flop 9 is a bistable device similar to the flip-flop 11, having likewise a second input which receives the pulses B2 from the delay device 3. The output of the flip-flop 9 is connected to the input of a delay device 10, which is similar to the delay device 12, except that the delay device 10 produces a delay of $t_b$, where $t_b$ is different for $t_a$. The action of the flip-flop 9 and delay device 10 is as described with reference to the flip-flop 11 and delay device 12. Thus the delay device 10 produces an output pulse B3 delayed a time $t_b$ after the pulse B2, provided that the flip-flop 9 has received a positive pulse at its first input during the previous interrogation-response cycle. The pulse B3 is fed through a diode 7, which prevents other pulses from reaching the delay device 10, to the input of the transmitter 13, which is thus keyed by pulses B1, B2 and B3 to produce a three pulse interrogation sequence. It is to be noted that a pulse cannot emerge from both delay devices 10 and 12 during the same interrogation, because when a four pulse response is received, the computer 40 emits a pulse either on the line 48 or on the line 60, but not on both. A pulse on the line 48 causes the delay device 10 to emit a pulse during the next interrogation, while a pulse on the line 60 causes the delay device 12 to emit a pulse.

The above description referred to the case of the pulse J1 emerging from the gate 33. In this case the flip-flop 52 remains in the "0" state with zero output voltage, and the closing of the diode switch 51 by the pulse R1 produces no result, since no positive output pulse is produced thereby. However, if the pulse J1 emerges from the gate 35, the flip-flop 50 is the one which remains in the "0" state, and the closing of the diode switch 49 by the pulse R1 then produces no effect on the warning device 53, offsetter 55 and flip-flop 9. The flip-flop 52 is then the one which is triggered into the "1" state, and the arrival of the pulse R1 closes the diode switch 51 momentarily causing the positive output voltage of the flip-flop 52 to be fed as a short pulse to a warning device 54, an offsetting device 56 and a diode 58 which is connected to the first input of the flip-flop 9.

The warning device 54 is similar to the warning device 53, but instructs the pilot to climb, since the emergence of the pulse J1 from the height gate 35 shows that the second aircraft is lower. The flip-flop 9 is triggered as in the case where the second aircraft was higher, and the pulse B3 is transmitted with a delay of $t_b$ after the pulse B2, as before. Thus the pulse B3 is transmitted with the delay $t_b$ whether the second aircraft is higher or lower, provided that the computer 40 has decided that collision is likely. The diode 58 prevents the output pulse from the diode switch 49 reaching the warner 54 and offsetting device 56, while the diode 57 prevents the output pulse from the diode switch 51 reaching the warner 53 and offsetting device 55.

The interval $t_b$ between the pulses B2 and B3 is outside the range of values which the interval $t_h$ between the pulse B1 and B2 can assume. This characteristic pulse spacing $t_b$, which will be referred to as code B, is decoded in the second aircraft as hereinafter described with reference to FIGURE 3, and the pilot of the second aircraft is instructed to change height, the direction of height change being given to the pilot by the responder in accordance with the decision which the responder has already taken and made use of in the response coding. In this way the pilot of a partly equipped aircraft, which carries no computer, is able to co-operate with the fully equipped aircraft in helping to avoid collision.

However, should the heights of the two aircraft be very nearly equal, this decision might change rapidly with the slight changes in relative height. Also, if the second aircraft carries an interrogator and the first aircraft responds to this interrogator, the responders in the two aircraft will make independent decisions on relative height, and these decisions may not be complementary owing to inaccuracies in coding height as a delay in the two interrogators and the two responders. Thus both pilots, for example, may be given instructions to climb, so that the danger of collision would not be reduced.

To avoid such occurrences, a system of offsetting the height coding is used. As has been described, when the computer 40 decides that collision is probable, one of two offsetting devices 55, 56 receives an input pulse. These offsetting devices are connected to the delay device 3, and may be, for example, bistable flip-flops, whose two states will be referred to as the "0" state and the "1" state. Thus, in the case of the second aircraft being higher, the pulse J1 emerges from the gate 33, and when the computer 40 emits the pulse R1, the diode switch 49 emits the pulse RR1 which triggers the offsetting device 55 from the "0" state into the "1" state. When it is in the "0" state, the offsetting device 55 does not affect the delay produced by the delay device 3, but when in the "1" state the output voltage is changed so that the delay produced by the delay device 3 is characteristic of a height somewhat lower than that indicated by the pressure sensor 4, that is, somewhat lower than the actual height of the first aircraft. Conversely, if the second aircraft were lower, the offsetting device 56 would be triggered and the delay produced by the delay device 3 would be characteristic of a height somewhat higher than the actual height. The offsetting devices are reset by the pulses B2.

The delay device 3 is conveniently a phantastron, the time of whose sweep is made to depend on a control voltage which is primarily determined by the pressure sensor 4, but which time is increased or decreased by a small amount when either the offsetting device 55 or the offsetting device 56 is in the "1" state.

Then in the subsequent interrogation, the delay device 3 produces an interval between the pulses B1 and B2 corresponding to a height, in the present example, lower than that of the first aircraft, and unambiguously lower than the height of the second aircraft, in spite of variations and errors. Thus the responder in the second aircraft will make the same decision as previously as to whether the second aircraft is higher or lower than the first, and the offsetting will be repeated by the interrogator in the same direction, when it receives the next response, and so on, so that a consistent indication of relative height will be given in both aircraft. Although these indications may not be correct when the two aircraft are at almost the same height, owing to errors affecting the initial decision on relative height, nevertheless they will lead to complementary height manouevres.

The preceding description has dealt with the various possibilities when the response consists of four pulses. Thus, briefly, if the first aircraft is manoeuvring, its pilot is warned to fly level, and when it is not manoeuvring the computer 40 is brought into use and decides whether or not the two aircraft are on collosion courses. In the case of a two pulse response, the computer 40 receives only one pulse, namely the pulse J1, which initiates the decoding action, but it is unable to complete the decoding and compute. However, the output of the pulse generator 1 may be fed to a further input of the computer 40, so that, before the beginning of the next interrogation the pulse A1 resets all the internal circuits of the computer 40 to their initial states.

To explain the means for distinguishing between a four-pulse and a two-pulse response, it will be most convenient to return, for the moment, to the case of the four-pulse response. Thus, the pulse C4 from the output of the gate 47 is also fed to a flip-flop 62, which generates a long pulse S1. This pulse is fed to the control input of a normally open gate 63, so that the gate 63 is closed only for the duration of the pulse S1. The line 66, carrying the pulse J1, is connected to the input of a delay device 64 producing a fixed delay, so that the output is a delayed pulse T1, which is fed into the signal input of the gate 63. The object of delaying the pulse J1, which is coincident with the pulse C2, before feeding it into the gate 63, is to allow time for the pulse C4 to generate the pulse S1 and close the gate 63. Thus if there is a fourth pulse C4, there is no output from the gate 63.

On the other hand, if there is no fourth pulse in the response, there is no output pulse C4 passed by the gate 47, and hence no pulse S1 emerges from the flip-flop 62 to close the gate 63. Thus the gate 63 remains open and passes the pulse T1 which is fed to the warning device 65 previously mentioned and via the diode 68 to the flip-flop 11. The diode 69 prevents the pulse T1 from reaching the warning device 61. The warning device 65 serves to inform the pilot that there is another aircraft in the vicinity, at the same height, which is either a minimally equipped aircraft, or a manoeuvring partly or fully equipped aircraft, since all these give a two pulse response, and that the computation is incomplete.

The flip-flop 11, on receiving the pulse T1, is triggered into the "1" state, as previously described with reference to the pulse Q1 in the case of a four pulse response where the computer 40 decides there will be no collision. Thus, as already described, the subsequent interrogation will consist of three pulses B1, B2 and B3, the interval between the pulses B2 and B3 representing code A. If the responder is fully or partly equipped, its responder will decode code A, and, as will be explained in detail with reference to FIGURE 3, when code A is received, the pilot of a fully or partly equipped aircraft which is manoeuvring is given different instructions from when it is not manoeuvring. Thus the instruction given to the pilot of the responding aircraft is, in this case, to stop manoeuvring. When he brings his aircraft to a level attitude, a four pulse response is given, enabling computation to be carried out in the first aircraft, as previously described.

If the second aircraft is minimally equipped, there is little point in levelling up, since course and speed data are never included in its response. Thus no computation of collision risk can be made, but the pilot of the minimally equipped aircraft is expected to take avoiding action in any case, and hence on reception of code A the responder warns him to change height. The pilot of the first aircraft need not take avoiding action, but the persistence of the warning given by the warning device 65 will make it clear that the responding aircraft is probably minimally equipped, and he can discover its relative bearing from the bearing indicator 67.

FIGURE 3 shows the responding apparatus carried in the second aircraft, and it is envisaged that a fully equipped aircraft would carry all this equipment, while in the case of a minimally equipped aircraft certain elements would be omitted, as hereinafter described.

The interrogation signal consists of two or three pulses, and it is shown in FIGURES 3 and 4 as being sent out as three pulses, B1, B2 and B3, which reach the responder after a time $t_0$ required for transmission. These pulses, on the carrier frequency $f_1$, are picked up by an omnidirectional antenna 80 and fed to a transmit-receive switch or diplexer 81 which routes the incoming signals to a receiver 82. The amplified and demodulated pulses $a1$, $a2$, $a3$ are fed to a delay device 83 which is controlled by a pressure sensor 84 so as to produce a delay $t_{hh}-t_s$ which is characteristic of the height of the second aircraft. The relationship between the time $t_{hh}$ and height is the same as that for the time $t_h$ in the interrogator; thus if $t_s$ represents a small change of height, $t_{hh}-t_s$ represents a height slightly lower than that of the second aircraft, provided that the delay increases with increasing height as will be assumed in this description.

If the apparatus of FIGURE 3 is carried by a fully equipped aircraft, that is to say, one carrying in addition the apparatus of FIGURE 1, the delay produced by the delay device 83 is preferably offset in the same direction as the delay produced by the delay device 3 of FIGURE 1 whenever the delay device 3 is offset. This is desirable to ensure that, when two fully equipped aircraft meet one another, the interrogator and responder in each aircraft will make the same decision as to relative height.

The delayed pulses $b1$, $b2$ and $b3$ produced by the delay device 83 are fed into a flip-flop 85 which produces a pulse of length $t_s$ for each input pulse, the output pulses being shown as pulses $c1$, $c2$, $c3$, and these pulses are fed to the control input of a gate 86, whose signal input is fed with the pulses $a1$, $a2$, $a3$ from the receiver 82. The pulses $c1$, $c2$, $c3$ are also fed to the input of a flip-flop 87, which in response to the trailing edge of each input pulse produces an output pulse of length $t_s$, the three output pulses being shown as $d1$, $d2$, $d3$. The latter pulses are fed into the control input of a gate 88, whose signal input is fed with the pulses, $a1$, $a2$, $a3$ from the receiver 82.

Thus the gate 86 is opened by the pulse $c1$ from a time $t_{hh}-t_s$ to a time $t_{hh}$ after the pulse $a1$, while the gate 88 is opened by the pulse $d1$ from a time $t_{hh}$ to a time $t_{hh}+t_s$ after the pulse $a1$, these times of opening the gates representing a small band of height below the second aircraft and a small band of height above the second aircraft. Now, if the height of the first aircraft is nearly the same as the height of the second aircraft, the interval $t_h$ between the pulses $a1$ and $a2$ will be nearly the same as $t_{hh}$, and thus the pulse $a2$ will coincide either with the pulse $c1$ in the gate 86, if the first aircraft is slightly lower, or with the pulse $d1$ in the gate 88, if the first aircraft is slightly higher. If the pulse $a2$ occurs during the pulse $c1$, the gate 86 produces an output pulse $e1$, while if the pulse $a2$ occurs during the pulse $d1$, the gate 88 produces an output pulse $g1$, the pulse $e1$ or $g1$ which appears being coincident with the pulse $a2$. If the first aircraft is almost at the same height as the second, so that $t_h$ is very nearly equal to $t_{hh}$, the pulse $a2$ may occur partly during the pulse $c1$ and partly during the pulse $d1$, so that both pulse $e1$ and pulse $g1$ appear. In the present example this last event will be assumed to occur, in order to show how a decision is made as to whether the first aircraft is regarded as lower or higher than the second aircraft.

The output signals from the gates 86, 88 are combined by feeding them through diodes 89, 90 to a line 91, so that when the pulse $e1$, the pulse $g1$ or both appear, a pulse $h1$ appears on the line 91 at a time coincident with the pulse $a2$. The pulse $h1$ is fed through a diode 110 to the input of a delay device 120, to generate the first response pulse.

As mentioned with reference to FIGURE 1, if the responder decides that the first aircraft is lower, the interval between the first and second response pulses is made equal to a characteristic value $t1$, whereas if the first aircraft is judged to be higher, this interval is made equal to a characteristic value $t2$ which is greater than $t1$. If coincidence occurs in the gate 86, this means that the first aircraft is lower, and thus the output of the gate 86, before combining it with the output of the gate 88, is fed as the pulse $e1$ to the input of a delay device 104, which produces the delay $t1$. Thus if a pulse $e1$ appears, the delay device 104 produces an output pulse $j1$ which is fed through diodes 109, 111 to the input of the delay device 120. The pulse $j1$ thus generates the second response pulse, occurring at a time $t1$ after the pulse $e1$ and hence at a time $t1$ after the pulse $h1$.

If coincidence occurs in the gate 88, this means that the first aircraft is higher, and thus the output of the gate 88 namely the pulse $g1$, before combining it with the output of the gate 86, is fed to the input of a delay device 106, which produces the delay $t2$. Thus if a pulse $g1$ appears, the delay device 106 produces an output pulse $k1$ which is fed to the signal input of a gate 107. It must be noted that the diode 89 prevents the pulse $g1$ from reaching the input of the delay device 104, while the diode 90 prevents the pulse $e1$ from reaching the input of the delay device 106.

In the event of nearly equal heights, where both pulses $e1$ and $g1$ appear, steps must be taken to prevent one of the two delayed pulses $j1$, $k1$ from reaching the delay device 120, otherwise no decision will have been made as to relative height. Thus the pulse $j1$ is fed to the input of a flip-flop 105, which produces an output pulse $m1$ whose leading edge coincides with the pulse $j1$ and whose length is somewhat longer than $t2-t1$, so that the end of the pulse $m1$ occurs later than the pulse $k1$. The pulse $m1$ is fed to the control input of the gate 107, so as to close this gate, which is normally open, and as already described, the pulse $k1$ is fed into the signal input of the gate 107.

Then, if the pulse $e1$ emerges from the gate 86, this pulse $e1$ causes the gate 107 to be in the closed state when the pulse $k1$ emerges from the delay device 106. Thus only the pulse $j1$ is fed to the delay device 120; that is, in this marginal case the responder decides that the first aircraft is below the second. If the first aircraft is clearly above the second, the pulse $e1$ does not appear, and the pulse $k1$, generated by the pulse $g1$, is passed by the gate 107 and fed through diodes 108, 111, to the input of the delay device 120, to generate the second response pulse at a time $t2$ after the first response pulse. The diode 108 prevents the pulse $j1$ from reaching the gate 107, and the diode 109 prevents the pulse $k1$ from reaching the delay device 104 or the flip-flop 105.

To produce the third and fourth response pulses, the outputs of the delay device 104 and the gate 107 are fed through diodes 109, 108 to a switch 114. An attitude sensitive gyroscope 96 controls the switch 114 so that when the aircraft is flying level, or nearly level, the switch 114 is closed and either pulse $j1$ or pulse $k1$ (whichever appears), is fed to the input of a delay device 115. The diode 111 prevents the pulse $h1$ from reaching the delay device 115. When the aircraft is manoeuvring so that a certain angle of roll or pitch is exceeded, the gyroscope 96 opens the switch 114, thus preventing any pulses from reaching the delay device 115. In this latter event, no third or fourth pulse is included in the response, which then becomes merely a two pulse response giving only relative height information.

In the present example, it is assumed that the switch 114 is closed and that the pulse $j1$ is fed to the delay device 115, which produces a delayed output pulse $n1$. This pulse is fed through a diode 112 to the input of the delay device 120. The pulse $n1$ is also fed to the input of a delay device 116, which produces a delayed output pulse $p1$. This pulse is fed through a diode 113 to the input of the delay device 120. The diodes 112, 113, prevent recirculation of pulses.

The delay device 115 is controlled by a first output from a resolver 117, and the delay device 116 is controlled by a second output from this resolver 117. This resolver 117 receives an angular input corresponding to the course of the second aircraft from a compass repeater 118, and positive and negative voltage inputs both proportional to the speed $V2$ of the second aircraft from a speed sensor 119. The resolver 117, which may be a sine-cosine potentiometer, produces at its first output a voltage proportional to the eastward component $V2 \sin y$ of the aircraft's speed and, at its second output, a voltage proportional to the northward component $V2 \cos y$ of the aircraft's speed. Thus under the control of these output voltages, the delay device 115 produces a delay dependent on $V2 \sin y$ and the delay device 116 produces a delay dependent on $V2 \cos y$.

The delay device 120 receives at its input the pulses $h1$, $j1$, $n1$, $p1$. The spacing between the pulse $h1$ and $j1$ is either $t1$ or $t2$, representing the height relation between the two aircraft. The spacing between the pulses $j1$ and $n1$ represents $V2 \sin y$, and the spacing between the pulses $n1$ and $p1$ represents $V2 \cos y$. The delay device 120 is also controlled by the speed sensor 119, and delays each input pulse by a time $t_v$ depending on the speed $V2$ of the second aircraft. This time $t_v$ decreases with increase of the speed $V2$, so that if the speed is increased, the response reaches the first aircraft a shorter time after the interrogation is sent out. As the interrogator accepts only responses whose first pulse arrives within a pre-arranged time of sending the interrogation, this decrease of $t_v$ with the speed $V2$ means that the faster the second aircraft is travelling, the greater the maximum range from which the response is accepted. This has the object of making the warning time before the moment of closest approach more nearly constant than would otherwise be the case, and supplements the effect of varying the length of the range gating pulse D1 in the interrogator of FIGURE 1.

As an alternative, especially for minimally equipped aircraft, the delay device 120 may produce a fixed delay related to the cruising speed of the second aircraft. In this case the connection to speed sensor 119 is obviously not required.

The delayed pulses produced at the output of the delay device 120 are shown as $q1$, $q2$, $q3$, $q4$, and these are used to key a transmitter 121, generating a carrier frequency $f_2$. The output of the transmitter 121 is fed to the diplexer 81, which routes the pulsed carrier to the antenna 80 which radiates the pulses omni-directionally. After the time $t_0$ required for transmission the signals reach the interrogator as the pulses C1, C2, C3 and C4.

In addition to producing a response signal, the apparatus of FIGURE 3 gives the pilot of the second aircraft information and instructions based on the relative height of the first aircraft and the coding in the interrogation signal. Thus there is provided a pulse detector and indicator 102 acting as a warning device which is connected directly to the output of the gate 86. On receiving one or more pulses $e1$, indicator 102 illuminates a sign which informs the pilot that the first aircraft is lower than the second. The sign may be marked with an arrow to indicate the appropriate direction of height manoeuvre, in this case an arrow pointing upwards. Additionally, there is provided a pulse detector and indicator 103 which is connected to the output of the gate 107. On receiving one or more pulses $k1$ which have appeared at the output of the gate 107, the indicator 103 illuminates a sign which informs the pilot that the first aircraft is higher than the second.

Codes A and B in the interrogation signal are recognised as follows. The pulse $h1$ on the line 91 is fed to the input of a delay device 92 which produces a fixed delay of $t_{aa}+t_e$, where $t_e$ is a time short compared with $t_{aa}$. This time $t_{aa}$ is nominally equal to delay $t_a$ produced by the delay device 12 in FIGURE 1, but may not be exactly equal to it owing to errors in producing the delays in both the interrogator and responder, and the time $t_e$ serves to allow for these errors. The delayed pulse $r1$ from the device 92 is fed to the signal input of a gate 93. The pulses $a1$, $a2$ and $a3$ from the receiver 82 are fed into a flip-flop 94 which produces, for each input pulse, a pulse of length $2t_e$ and these lengthened pulses $s1$, $s2$, $s3$ are fed into the control input of the gate 93. The interval between the pulse $a2$ (which is coincident in time with the pulse $h1$) and the pulse $a3$ is assumed, in this case, to be $t_a$. Hence the time between the pulse $h1$ and the leading edge of the pulse $a3$ is $t_a$, and the time between the pulse $h1$ and the trailing edge of the pulse $s3$ is $t_a+2t_e$. Now the pulse $r1$ is delayed by a time $t_{aa}+t_e$ after pulse $h1$, and hence if pulse $r1$ occurs during pulse $s3$ (which is of length $2t_e$), it means that $t_a$ and $t_{aa}$ are equal to within $t_e$. In this event, coincidence of the pulses $r1$ and $s3$ occurs in the gate 93 which produces an output pulse $u1$. The appearance of pulse $u1$ signifies that the interrogation included code A. However, code A has two meanings, depending on whether the first aircraft received a response consisting of two or four pulses. Accordingly, a switch 95 is provided and is operated by the gyroscope 96 to feed the pulse $u1$ either to a warning device 97 or to a warning device 98. Whenever the switch 114 is closed by the gyroscope 96, so that the response contains four pulses, the switch 95 is operated to feed the pulse $u1$ to the warning device 97, which warns the pilot to maintain his existing course and speed. This warning signifies that the second aircraft has been interrogated, that a four pulse response has been sent, that the response has been accepted by the interrogator's range gate, and that the computer has decided that the two aircraft are not on collision courses.

On the other hand, when the switch 114 is opened by the gyroscope 96, so that the response contains only two pulses, the switch 95 is operated to feed the pulses $u1$ to the warning device 98, which warns the pilot to fly straight and level. This warning signifies that the two pulse response has been accepted by the interrogator's range gate.

For code B, the pulse $h1$ on the line 91 is fed to a delay device 99, similar to delay device 92, but producing a fixed delay $t_{bb}+t_e$, where time $t_{bb}$ is nominally equal to the delay $t_b$ produced by the delay device 10 in FIGURE 1. The delayed output pulse is fed to the signal input of a gate 100, similar to the gate 93, and the gate 93 receives the pulses $s1$, $s2$, $s3$ at its control input. If coincidence occurs in the gate 100, this means that the interval $t_b$ between the pulses $a2$ and $a3$ is approximately equal to $t_{bb}$, signifying that the interrogation included code B. The output pulses from the gate 100 are fed to a warning device 101, which instructs the pilot to change height. The direction of height change, whether climb or dive, is shown by the indication on one of the two indicators 102, 103.

The function of the diode 110 is to prevent the pulses $j1$, $n1$ and $p1$ from reaching the delay devices 92, 99, over the line 91.

If the responding aircraft is minimally equipped, it will not carry all the apparatus shown in FIGURE 3. The response will contain only the two pulses $q1$, $q2$, whatever the attitude of the aircraft, the responder cannot interpret Code B, and interprets Code A in only one way. Hence the responder consists of the apparatus of FIGURE 3 with the omission of switch 114, gyroscope 96, delay devices 115, 116, diodes 111, 112, 113, resolver 117, compass repeater 118, delay device 99, gate 100, warning device 101, switch 95 and warning device 98. The diode 111 is replaced by a direct connection. The output of the gate 93 is permanently connected to the warning device 97, and in this minimally equipped aircraft, the operation of the warning device 97 signifies that its pilot must immediately change height to avoid the first aircraft. That is, since no computation of collision risk is possible, the proximity of another aircraft at the same height must be regarded as dangerous. All the rest of the responding apparatus works exactly as previously described, and the direction of height change is again given by the indicators 102, 103.

As already mentioned the delay device 120 may produce a fixed delay, in which case a minimally equipped aircraft need not carry the speed sensor 119. The delay device 120 may in fact be omitted and replaced by a direct connection, so that pulses $h1$, $j1$ key the transmitter 121 directly. The omission of the delay device 120 has only the disadvantage that the proximity warning, requiring a change of height, is given at greater range, and is therefore liable to occur more often.

The above circuit is shown in FIGURE 5.

We claim:

1. Collision prevention apparatus for aircraft including an interrogator transmitter and receiver in a first aircraft and a responder receiver and transmitter in a second aircraft, wherein the responder includes means to transmit as a response signal height, course and speed information relating to said second aircraft and the interrogator includes a computer and means to pass response signals to such computer to determine the risk of collision between said two aircraft, means being provided such that the computation cannot be carried out unless both aircraft are flying on straight and level courses.

2. Apparatus according to claim 1, wherein said interrogator includes an attitude sensitive device responsive to the attitude of said first aircraft and effective to disconnect the computer except when the first aircraft is flying straight and level.

3. Apparatus according to claim 2, including omni-directional and directional antennae for said interrogator and said attitude sensitive device is also effective to change the antenna used for interrogating from said directional antenna to said omni-directional antenna when said first aircraft is not flying straight and level.

4. Apparatus according to claim 2, including a device to warn the pilot of the first aircraft to fly on a straight and level course and wherein, when the first aircraft is not flying straight and level, the attitude sensitive device acts to pass a response signal to said device.

5. Collision prevention apparatus for aircraft including an interrogator transmitter and receiver in a first aircraft; a responder receiver and transmitter in a second aircraft; means in said first aircraft to generate an interrogation signal; means in said second aircraft to generate a response signal; means to code such response signal with the height, course and speed of said second aircraft; a computer to compute collision risks in said first aircraft; means to pass received response signals to such computer; means to prevent such computation unless both aircraft are flying straight and level courses; a range gate in said first aircraft acting on said response signals; and means to control such range gate to accept response signals only for a pre-determined time after the interrogation signal is transmitted.

6. Apparatus according to claim 5, including an attitude sensitive device, and first and second time setting devices for said range gate, said attitude sensitive device being effective to change the control of the range gate from said first time setting device when the first aircraft is flying straight and level to said second time setting device when the first aircraft is not flying straight and level.

7. Apparatus according to claim 6, including means to resolve the speed of said first aircraft and means to control said first time setting device in accordance with the resolved component of speed in the direction of interrogation.

8. Apparatus according to claim 6, wherein the second time setting device in controlled by the actual speed of the first aircraft.

9. Collision prevention apparatus for aircraft including an interrogator transmitter and receiver in a first aircraft; a responder receiver and transmitter in a second aircraft; means to generate two pulses separated by a time interval characteristic of the height of the first aircraft to act as an interrogation signal; means in said second aircraft to generate a response signal; means to code such response signal with the height, course and speed of said second aircraft; a computer to compute collision risks in said first aircraft; means to pass received response signals to such computer; and means to prevent such computation unless both aircraft are flying straight and level courses.

10. Apparatus according to claim 9, wherein means are provided in the second aircraft to measure said time interval; to measure the height of said second aircraft and to generate a response signal only if said second aircraft is flying at approximately the same height as the first aircraft.

11. Apparatus according to claim 9, including means in the responder to determine the direction of height separation of said second aircraft relative to said first aircraft, and means to code the response signal accordingly.

12. Apparatus according to claim 11, wherein said means for determining the height separation comprises first and second gates open respectively for a time corresponding to a height band slightly below and a height band slightly above the height of the second aircraft, and means to detect which such gate passes the interrogation signal.

13. Apparatus according to claim 12, including two devices, associated respectively with the outputs of said two gates, for generating fixed time delays to form part of the response signal, whereby the response signal comprises first and second pulses, the interval between such pulses indicating the direction of height separation between the two aircraft.

14. Apparatus according to claim 13, including separate means in the first aircraft to detect the coding of the response signal in accordance with the direction of the height separation.

15. Apparatus according to claim 14, including means to modify the interrogation signal if the computation based on the immediately preceding response signal indicates that a collision is likely, such modification being in accordance with the direction of the height separation between the two aircraft.

16. Apparatus according to claim 15, wherein said means to modify the interrogation signal comprises means to change the time separation of the height coding in a direction to indicate a greater separation between the two aircraft.

17. Apparatus according to claim 15, wherein said means to modify the interrogation signal comprises means to add a further pulse at a specific time to instruct the second aircraft to manoeuvre.

18. Apparatus according to claim 17, wherein means are provided in the second aircraft to detect said further pulse, such means comprising a gate open at said specific time and a device activated on the passing of a signal through such gate, thereby to warn the pilot of the second aircraft to manoeuvre.

19. Collision prevention apparatus for aircraft including an interrogator transmitter and receiver in a first aircraft; a responder receiver and transmitter in a second aircraft; means in said first aircraft to generate an interrogation signal; means to code said interrogation signal with the height of the first aircraft; means in said second aircraft to determine the direction of height separation; means in said second aircraft to generate a response signal; means to code such response signal with the direction of height separation, course and speed of said second aircraft; a computer to compute collision risks in said first aircraft; means to pass received response signals to such computer; means to prevent such computation unless both aircraft are flying straight and level courses; a warning device in said first aircraft; and means to pass an output from the computer indicating that a collision is likely to said warning device in combination with a signal dependent upon the direction of height separation, thereby to indicate the course of action to be adopted by the pilot of the first aircraft.

20. Collision prevention apparatus for aircraft including an interrogator transmitter and receiver in a first aircraft; a responder receiver and transmitter in a second aircraft; means in said first aircraft to generate an interrogation signal; means in said second aircraft to generate a response signal; means to code such response signal with the height, course and speed of said second aircraft; a computer to compute collision risks in said first aircraft; means to pass received response signals to such computer; means to prevent such computation unless both aircraft are flying straight and level courses; a device to warn the pilot of said first aircraft to maintain the present course and speed; and means such that if the computer computes that no collision is likely, to pass a signal to said warning device.

21. Apparatus according to claim 20, including means to modify the next subsequent interrogation signal in such a manner as to warn the pilot of the second aircraft to continue to fly upon his present course, and means to pass said signal to such interrogation modifying means.

22. Collision prevention apparatus for aircraft including an interrogator transmitter and receiver in a first aircraft; a responder receiver and transmitter in a second aircraft; means in said first aircraft to generate an interrogation signal; means in said second aircraft to generate a response signal; means to code such response signal with the height, course and speed of said second aircraft; a computer to compute collision risks in said first aircraft; means to pass received response signals to such computer; means to disconnect said computer when said first aircraft is not flying straight and level; and means active to suppress that part of the response signal indicating course and speed when the second aircraft is not flying upon a straight and level course, whereby the computer in the first aircraft is unable to compute by reason of insufficient information.

23. Apparatus according to claim 22, including means to generate a signal to modify the next subsequent interrogation signal and activated when the computer is unable to compute by reason of inadequate information, to thereby instruct the pilot of the second aircraft to fly upon a straight and level course.

24. Apparatus according to claim 22, including means to generate a signal to warn the pilot of the first aircraft when the computer is unable to compute by reason of inadequate information.

25. Apparatus according to claim 22, wherein the response signal comprises four pulses of which the last two pulses are characteristic of course and speed, and means are provided to pass a pulse sequentially to first and second delay devices set in accordance with the course and speed of the second aircraft.

26. Apparatus according to claim 25, including an attitude sensitive device in the second aircraft, effective to disconnect said two delay devices when the second aircraft is not flying upon a level course, thereby to suppress said third and fourth pulses.

27. Collision prevention apparatus for aircraft including an interrogator transmitter and receiver in a first aircraft; a responder receiver and transmitter in a second aircraft; means in said first aircraft to generate an interrogation signal; means in said second aircraft to generate a response signal; means to code such response signal with the height, course and speed of said second aircraft; a computer to compute collision risks in said first aircraft;

means to pass received response signals to such computer; an attitude sensitive device in the second aircraft; means operated by said attitude sensitive device to suppress that part of the response signal coded with course and speed when the second aircraft is not flying straight and level; means to modify the interrogation signal; a first output from said computer to indicate that no collision is likely; a device in the first aircraft to detect suppression of part of the response signal and having a second output; means passing said first and second outputs to said means to modify the interrogation signal; means in said second aircraft to detect such modification and to give a third output; a first warning device in the second aircraft to instruct the pilot to maintain the instant course and speed; a second warning device in the second aircraft to instruct the pilot to level up; and means controlled by said attitude sensitive device selectively passing said third output to said first and second warning devices.

28. Apparatus according to claim 27, wherein said modification of the interrogation signal comprises the addition of a third pulse at a specific interval and the means to detect such modification comprise a gate open for a short time corresponding to such specific interval.

29. Apparatus according to claim 5, including, in the second aircraft, a device sensitive to speed; a delay device set by said speed sensitive device; and means passing the response signal to said responder transmitter via said delay device.

References Cited in the file of this patent

UNITED STATES PATENTS

| | | |
|---|---|---|
| 2,568,568 | Stansbury | Sept. 18, 1951 |
| 2,980,908 | Vielle | Apr. 18, 1961 |